United States Patent [19]

Crowson

[11] Patent Number: 4,489,483
[45] Date of Patent: Dec. 25, 1984

[54] METHOD OF MAKING AN ELECTRICAL CURRENT INPUT TO A PNEUMATIC SIGNAL OUTPUT TRANSDUCER CONSTRUCTION

[75] Inventor: James A. Crowson, Knoxville, Tenn.

[73] Assignee: Robertshaw Controls Company, Richmond, Va.

[21] Appl. No.: 503,815

[22] Filed: Jun. 13, 1983

Related U.S. Application Data

[62] Division of Ser. No. 265,599, May 20, 1981, Pat. No. 4,401,263.

[51] Int. Cl.³ .................. H01F 41/00; H01H 11/00
[52] U.S. Cl. .................................. 29/602 R; 29/622; 335/258
[58] Field of Search ............ 335/193, 219, 238, 239, 335/255, 258, 270, 273, 274; 236/84, 86, 87; 29/602 R, 622

[56] References Cited

U.S. PATENT DOCUMENTS

| | | | |
|---|---|---|---|
| 4,194,687 | 3/1980 | Scott | 236/87 |
| 4,218,669 | 8/1980 | Hitchcock et al. | 335/258 |
| 4,286,243 | 8/1981 | Bauer | 335/258 X |
| 4,290,040 | 9/1981 | Feightner et al. | 335/258 X |
| 4,304,391 | 12/1981 | Yamaguchi | 335/258 X |

Primary Examiner—Carl E. Hall
Attorney, Agent, or Firm—Candor, Candor & Tassone

[57] ABSTRACT

An electrical current input to a pneumatic signal output transducer construction wherein the signal is substantially proportional to the current and is generated by a pneumatic relay of the construction that is controlled by an electrical current receiving unit of the construction, the current receiving unit comprising a fixed electrical coil that is adapted to have the current flow therethrough and a movable armature disposed in the coil and being operatively interconnected to the relay to control the relay in relation to the position of the armature relative to the coil.

3 Claims, 4 Drawing Figures

METHOD OF MAKING AN ELECTRICAL CURRENT INPUT TO A PNEUMATIC SIGNAL OUTPUT TRANSDUCER CONSTRUCTION

CROSS-REFERENCE TO RELATED PATENT APPLICATION

This application is a divisional patent application of its co-pending parent patent application, Ser. No. 265,599, filed May 20, 1981, now U.S. Pat. No. 4,401,263.

BACKGROUND OF THE INVENTION

1. Field of the Invention

This invention relates to an electrical current input to a pneumatic signal output transducer construction and to a method of making the same.

2. Prior Art Statement

It is known to provide an electrical current input to a pneumatic signal output transducer construction wherein the signal is substantially proportional to the current and is generated by a pneumatic relay means of the construction that is controlled by an electrical current receiving means of the construction, the current receiving means comprising a fixed permanent magnet and a movable electrical coil that is adapted to have the current flow therethrough and is operatively interconnected to the relay means to control the relay means in relation to the position of the coil relative to the permanent magnet.

It is also known from the U.S. Patent to Scott, U.S. Pat. No. 4,194,687, to provide a relay means wherein a cage-like member carries a movable valve member that is adapted to close a valve seat of the cage-like member as well as close another valve seat that is adapted to project through the valve seat of the cage-like member.

It is also known from the patent application, Ser. No. 080,573, filed Oct. 1, 1979, to operatively interconnect leaf springs to an armature of a solenoid coil means to prevent the armature from reaching a full zero gap position during the pull in of the armature by the energized coil means whereby a substantially silent solenoid arrangement is provided for electrical switch operation.

SUMMARY OF THE INVENTION

One feature of this invention is to provide an improved electrical current input to a pneumatic signal output transducer construction wherein the pneumatic signal is substantially proportional to the electrical current.

In particular, it was found according to the teachings of this invention that a unique solenoid coil-like arrangement could be utilized to operate a pneumatic relay in a manner to produce a substantially linear pneumatic signal in relation to a substantially linear change in the electrical current input being directed through the coil means of the solenoid-like arrangement.

In particular, one embodiment of this invention provides an electrical current input to a pneumatic signal output transducer construction wherein the signal is substantially proportional to the current and is generated by a pneumatic relay means of the construction that is controlled by an electrical current receiving means of the construction, the electrical current receiving means comprising a fixed electrical coil that is adapted to have the electrical current flow therethrough and a movable armature disposed in the coil and being operatively interconnected to the relay means to control the relay means in relation to the position of the armature relative to the coil.

Accordingly, it is an object of this invention to provide an improved electrical current input to a pneumatic signal output transducer construction having one or more of the novel features of this invention as set forth above or hereinafter shown or described.

Another object of this invention is to provide a method of making such a transducer construction, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENT

Figure 1:
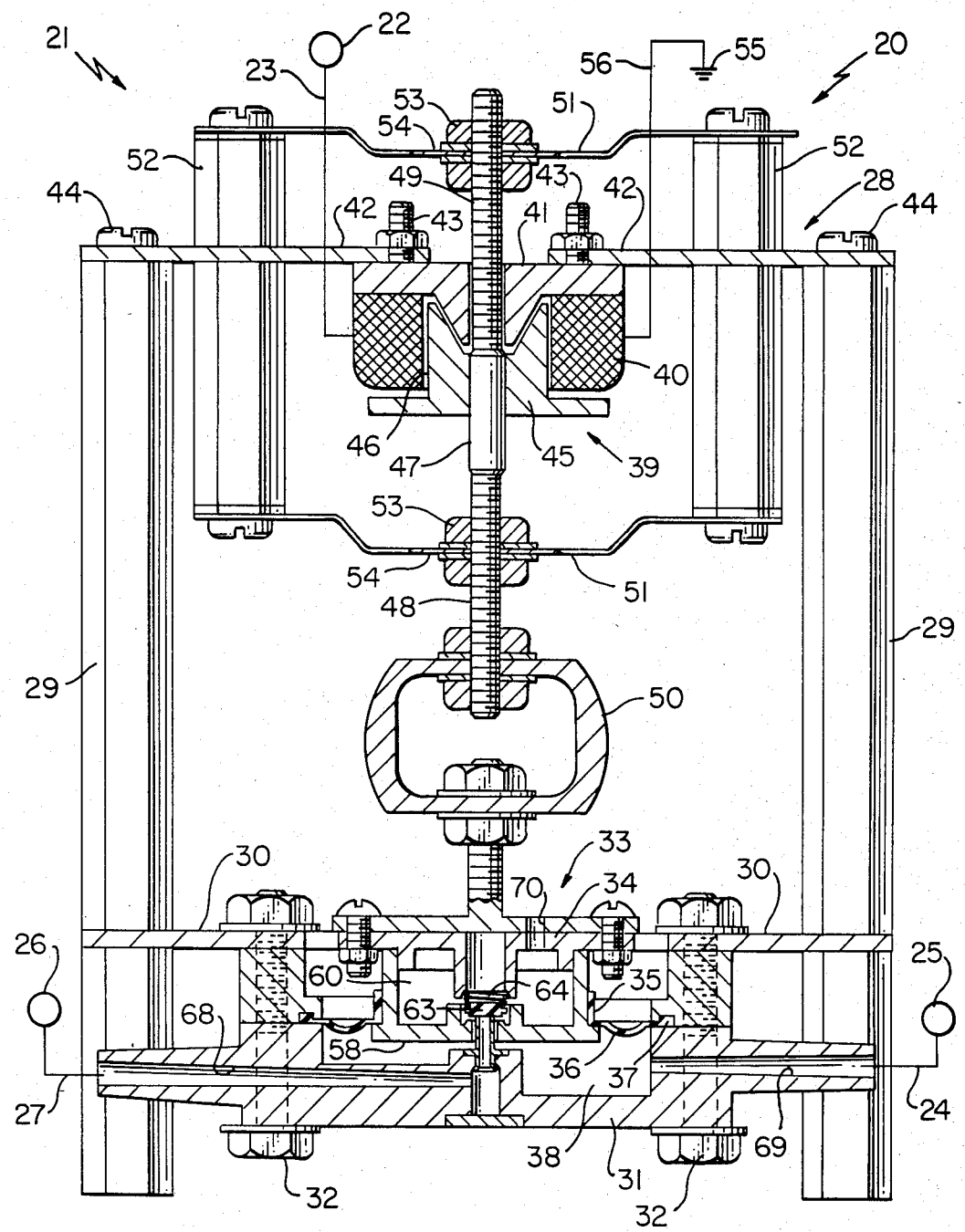
FIG. 1 is a cross-sectional view illustrating the improved transducer construction of this invention.

While the various features of this invention are hereinafter described and illustrated as being particularly adapted to provide a transducer construction that provides a vacuum output signal, it is to be understood that the various features of this invention can be utilized singly or in any combination thereof to provide a transducer construction for providing other types of pneumatic signals as desired.

Therefore, this invention is not to be limited to only the embodiment illustrated in the drawings, because the drawings are merely utilized to illustrate one of the wide variety of uses of this invention.

Referring now to FIG. 1, the improved transducer construction of this invention is generally indicated by the reference numeral 20 and is illustrated as being utilized in a system that is generally indicated by the reference numeral 21 and includes an electrical current signal sending source 22 for directing an electrical input signal to the transducer 20 through a lead 23 that causes the transducer 20 to create a vacuum output signal in a conduit means 24 that leads to a vacuum operated device 25 in such a manner that the value of the pneumatic output signal is substantially proportional to the value of its electrical input signal, the transducer construction 20 creating the vacuum output signal from a vacuum source 26 interconnected to the transducer 20 by a conduit means 27.

While the system 21 can comprise any desired control system or the like, one use of the transducer construction 20 of this invention in the system 21 is to provide means for positioning a vacuum operated exhaust gas recirculation (EGR) valve construction of a transportation vehicle in relation to an electrical signal created by a computer also carried by the transportation vehicle which determines from various inputs thereto what the optimum positioning of the EGR valve construction should be.

In any event, it has been found according to the teachings of this invention that the transducer construction 20 can effectively translate an electrical current input signal into a vacuum output signal that has a value that is substantially proportional to the value of the electrical input signal and the details of the structure and operation of the transducer construction 20 will now be described.

The transducer construction 20 of this invention comprises a frame means that is generally indicated by the reference numeral 28 and includes a plurality of post means 29 interconnected together in any suitable manner, such as by a pair of plates 30 respectively interconnected together by a bridging housing member 31 respectively secured to the plates 30 by fastening means 32 as illustrated.

The housing member 31 forms part of a pneumatic relay means of the transducer construction 20 that is generally indicated by the reference numeral 33 and includes a movable cage-like unit 34 secured to the inner peripheral portion 35 of a flexible diaphragm 36 that has its outer peripheral portion 37 fixed to the housing member 31 and cooperating therewith to define an output chamber 38 of the relay means 33 as will be apparent hereinafter.

The frame means 28 of the transducer construction 20 also carries an electrical current receiving means that is generally indicated by the reference numeral 39 and comprises a fixed electrical coil 40 carried by a bridging member 41 that is interconnected to a pair of plates 42 by fastening means 43, the plates 42 being respectively secured to the post means 29 by fastening means 44.

In this manner, the upper plate means 42 interconnect the upper portion of the post means 29 together while the lower plate means 30 interconnect the lower portion of the post means 29 together.

The electrical current receiving means 39 includes an armature means 45 that has a portion 46 disposed for axial movement inside the coil means 40 in a manner similar to a conventional core member of a solenoid coil arrangement.

The armature 45 is fixed to a shaft or rod means 47 that has opposed ends 48 and 49 extending beyond the opposed sides of the armature 45 and are respectively externally threaded as illustrated, the threaded end 48 of the shaft 47 being interconnected to a member 50 to the cage 34 of the relay means 33 as illustrated, the member 50 being threadedly interconnected to the end 48 of the shaft 47 as well as threadedly interconnected to cage 34 of the relay means 33 as illustrated.

It is preferred that the interconnecting member 50 as well as the plates 42 and 30 be formed of non-magnetic material, such as brass, so that the same will not have any adverse influence on the positioning of the armature 45 relative to the coil means 40 as will be apparent hereinafter.

In any event, it can be seen that the armature 45 is operatively interconnected by the shaft 47 and member 50 to the cage 34 of the relay means 33 so that the cage 34 of the relay means 33 is positioned relative to the housing 31 in relation to the position of the armature 45 relative to the coil 40.

A pair of leaf springs 51 are respectively interconnected to the opposed ends 48 and 49 of the shaft 47 and are respectively carried by post means 52 respectively secured to the plate means 42.

While the leaf springs 51 can be interconnected to the shaft 47 in any suitable manner, each leaf spring 51 has a threaded fastening member 53 carried by a medial portion 54 thereof and through which the respective threaded end 48 or 49 of the shaft 47 is threaded so that the initial position of the shaft 47 and, thus, the armature 45 relative to the springs 51 can be adjusted.

The force of the springs 51 normally maintains the armature 45 in its downward position relative to the coil 40 and tends to resist the movement of the armature 45 upwardly into the coil 40, the movement of the armature 45 upwardly into the coil 40 being caused by an electrical current flow through the coil means 40 from the lead means 23 and to ground 55 through a lead means 56.

It has been found according to the teachings of this invention that the rate of the springs 51 resisting the movement of the coil 45 upwardly into the coil means 40 should be such that the armature 45 will never be in its full pull-in or zero gap position in the coil 40 even at the maximum electrical current input signal that can be directed to the coil 40 by the signal sender 22.

In this manner, the movement of the armature 45 into the coil 40 will be substantially linear as the value of the electrical current increases between its zero value to the highest signal value thereof that can be produced by the signal sender 22 because it has been found that when an armature approaches the full pull-in position or its zero gap position in a solenoid coil, a snap acting effect on the armature is normally created the closer the armature comes to the full pull-in position thereof. Thus, if the springs 51 always prevent the armature 41 from coming to its full pull-in position, no such snap acting action can take place at the maximum electrical current signal value produced by the device 22.

The relay means 33 is of a type similar to the relay means of the aforementioned U.S. Patent to Scott, U.S. Pat. No. 4,194,687 and such patent to Scott is being incorporated in this disclosure by this reference thereto in order to provide information concerning the details and operation of such a relay means.

Nevertheless, sufficient details of the structure and operation of the relay means 33 will now be described in order to understand the features of this invention.

The cage-like member 34 of the relay means 33 has an opening 57 passing through a bottom wall 58 thereof and defines a valve seat 59 on the upper end of the opening 57 that leads to a chamber 60 in the cage-like member 34.

The housing 31 has a tubular member 61 adapted to project through the opening 57 of the cage-like member 34 and has an upper end 62 that is adapted to be opened and closed by a movable resilient valve member 63 carried by the cage-like member 34 and normally urged against the valve seat 59 to close the opening 57 by a compression spring 64 having one end 65 bearing against the valve member 63 and the other end 66 thereof bearing against a tubular extension 67 of the cage-like member 34.

The tubular member 61 of the housing 31 is interconnected to an internal passage means 68 of the housing 31, the internal passage means 68 of the housing 31 being interconnected to the conduit means 27 that leads to the vacuum source 26.

The output chamber 38 of the housing means 31 is interconnected to the output conduit 24 by an internal passage means 69 of the housing 31 as illustrated.

The chamber 60 of the cage-like member 34 is interconnected to the atmosphere by a vent opening 70 formed through the cage-like member 34.

Thus, it can be seen that the improved transducer construction 20 of this invention can be formed from a relatively few parts by the method of this invention as previously described to operate in a manner now to be described.

Assuming that the computer 22 is initially not sending any electrical signal to the coil 40 so that the force of the leaf springs 51 holds the armature 45 in its most downward position relative to the coil 40. This position of the armature 45 also positions the cage 34 of the relay means 33 in the position illustrated in FIG. 2 wherein the valve seat 59 of the cage-like member 34 is disposed spaced below the upper end 62 of the tubular member 61 so that the compression spring 64 maintains the resilient valve member 63 in a closed condition against the end 62 of the tubular member 61 while the tubular member 61 holds the valve member 63 away from the valve seat 59. In this manner, the vented chamber 60 of the cage-like member 64 is in full communication through the opened valve seat 59 to the output chamber 38 so that the controlled device 25 is in the condition thereof that is caused by a no vacuum signal being presented to the device 25 because the vacuum source 26 is completely disconnected from the output chamber 38 of the housing 31 by having the end 62 of the tubular member 61 closed off by the valve member 63 as illustrated in FIG. 2.

Figure 3:
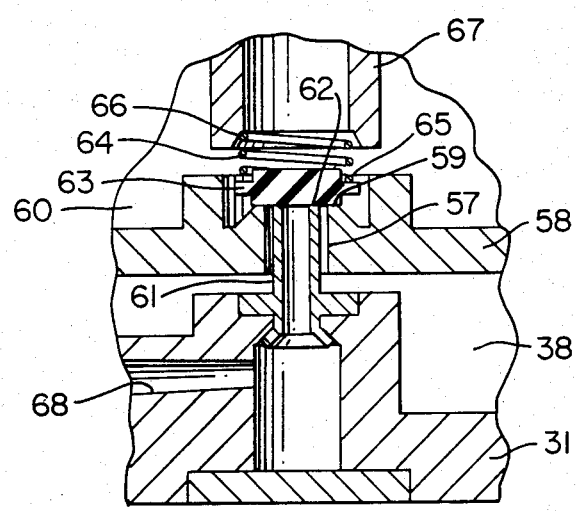
FIG. 3 is a view similar to FIG. 2 and illustrates the relay means in its balanced condition.
Figure 4:
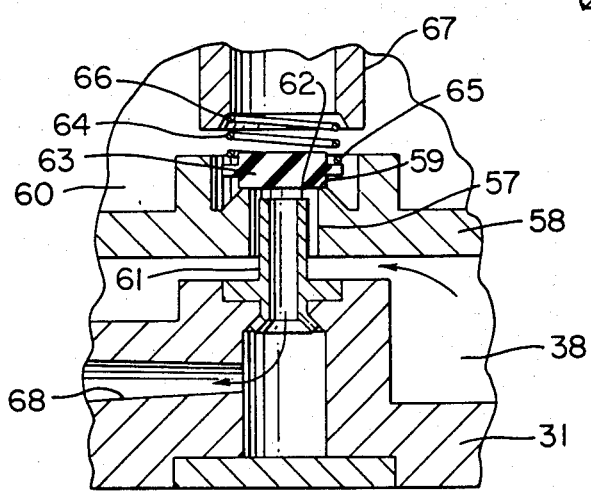
FIG. 4 is a view similar to FIG. 2 and illustrates the relay means in its evacuating condition.

However, when the computer 22 directs an electrical signal to the coil 40 through the lead 23 so that the flow of electrical current through the coil 40 from the lead 23 to the grounded lead 56 draws the armature 45 upwardly into the coil 40 a certain amount in opposition to the force of the leaf springs 51, the cage 34 moves upwardly with the armature 45 to the position illustrated in FIG. 4 wherein the upwardly moving cage 34 has the valve seat 59 thereof engaged against the valve member 63 on the end 62 of the tubular member 61 and carries the same upwardly away from the end 62 of the tubular member 61 so that not only is the valve seat 59 now closed by the valve member 63 under the force of the compression spring 64 so that the vent chamber 60 is no longer interconnected to the output chamber 38, but also the vacuum source 26 is now interconnected to the chamber 38 because of the opened end 62 of the tubular member 61. Thus, the vacuum source 26 now begins to evacuate the chamber 38 to create a vacuum value therein which causes a resulting pressure differential to act across the diaphragm means 36 in a direction to tend to move the cage-like member 34 back downwardly and pull the armature 45 downwardly therewith. When the forces are balanced in such a manner that the downwardly pulling pressure differential across the diaphragm 36 coupled with the force of the leaf springs 51 pulling downwardly equals the upwardly pulling force of the current flowing through the coil 40 to draw the armature 45 upwardly, the relay means 33 becomes balanced as illustrated in FIG. 3 wherein the cage 34 has moved back downwardly to such a position that the valve member 63 is closing off the end 62 of the tubular member 61 as well as closing off the valve seat 59 so that the vacuum source 26 is no longer interconnected to the upper chamber 38 and the vent chamber 60 still remains also out of communication with the chamber 38 whereby a certain vacuum value has now been created in the output chamber 38 which is proportional to the particular value of the electrical current flowing through the coil 40. Thus, the output vacuum signal being directed to the vacuum operated device 25 by the conduit means 24 positions the vacuum operated device 25 in a position thereof that corresponds to the value of the electrical input signal from the computer 22.

Accordingly, it can be seen that should the electrical signal being sent to the coil 40 subsequently increase in value to pull the armature 45 further upwardly, the cage-like member 34 moves therewith to again interconnect the vacuum source 26 to the chamber 38 until a balanced condition results as illustrated in FIG. 3 to create a new vacuum value in the chamber 38 which corresponds to the increased electrical signal. This new vacuum value in the chamber 38 causes a repositioning of the controlled device 25.

Figure 2:
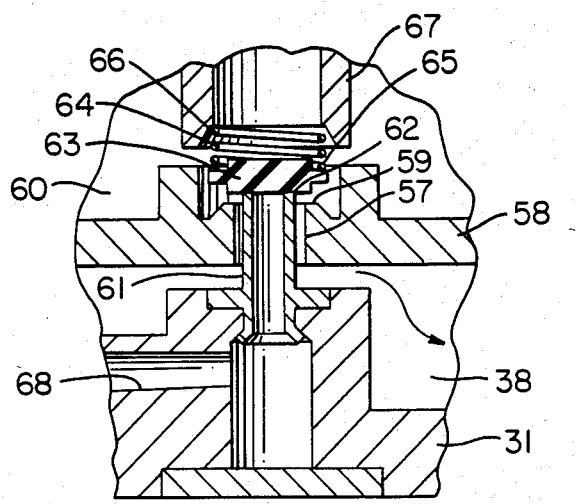
FIG. 2 is an enlarged fragmentary cross-sectional view of a portion of the pneumatic relay means of the transducer of FIG. 1 and illustrates the relay means in its venting condition.

Conversely, should the value of the electrical signal being sent by the computer 22 to the coil 40 subsequently decrease, the force of the springs 51 and the pressure differential acting across the diaphragm 36 moves the cage-like member 34 downwardly as illustrated in FIG. 2 to permit the vent chamber 60 to be interconnected to the chamber 38 to decrease the vacuum value therein until the balanced condition of FIG. 3 is again reached so that the new vacuum value in the chamber 38 corresponds to the new electrical signal value to position the control device 25 at the new position thereof corresponding to the new value of the electrical input signal from the computer 22.

Thus, as long as the positive mechanical spring rate of the springs 51 is greater than the negative force—gradient of the coil 40 and armature 45 combination so that the movement of the armature 45 is approximately proportional to the electrical current, there will be no snap action armature movement as the armature 45 approaches the full pull-in position thereof that is normally characteristic of typical solenoid operated valves and the like. In this manner, the output pneumatic signal from the relay 33 is substantially linear over the range of the values of the electrical signals capable of being sent to the coil 40 by the computer 22.

Therefore, it can be seen that this invention not only provides an improved electrical current input to pneumatic signal output transducer construction, but also this invention provides an improved method of making such a transducer construction.

While the form and method of this invention now preferred have been illustrated and described as required by the Patent Statute, it is to be understood that other forms and method steps can be utilized and still fall within the scope of the appended claims.

What is claimed is:

1. In a method of making an electrical current input to a pneumatic signal output transducer construction wherein said signal is substantially proportional to said current and is generated by a pneumatic relay means of said construction that is controlled by an electrical current receiving means of said construction, the improvement comprising the steps of: forming said current receiving means to comprise a fixed electrical coil that is adapted to have said current flow therethrough and a movable armature disposed in said coil and being operatively interconnected to said relay means to control said relay means in relation to the position of said armature relative to said coil, disposing spring means to be carried by said construction and be operatively interconnected to said armature to tend to move said armature relative to said coil in a direction opposite to the direction of movement of said armature upon increased current flow through said coil, forming said spring means to comprise a plurality of leaf springs, disposing said leaf springs on opposite sides of said coil, forming said armature with a shaft interconnected thereto and extending from opposed sides of said armature, interconnecting opposed ends of said shaft respectively to said leaf springs, and adjustably interconnecting said opposed ends of said shaft to said leaf springs.

2. A method of making a transducer construction as set forth in claim 1 and including the steps of fixing the opposed ends of each leaf to said construction, and adjustably interconnecting the medial portion of each leaf spring to said shaft.

3. A method of making a transducer construction as set forth in claim 2 and including the step of threadedly interconnecting said opposed ends of said shaft respectively to said medial portions of said leaf springs.

* * * * *